Sept. 7, 1926.
J. T. SULLIVAN
1,598,992
MOTOR VEHICLE
Filed July 3, 1925  3 Sheets-Sheet 1
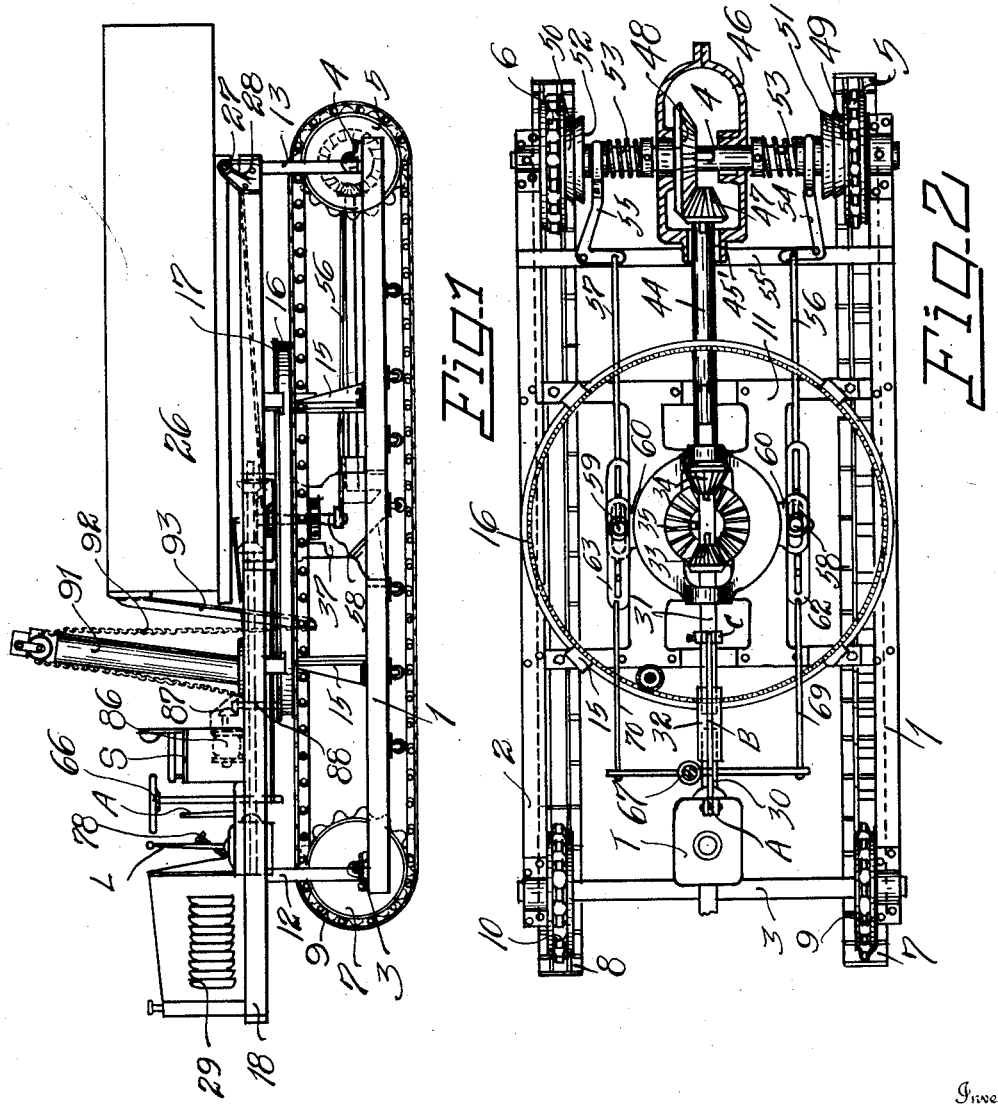
Inventor
John T. Sullivan
By Herbert E. Smith
Attorney Sept. 7, 1926.

J. T. SULLIVAN

MOTOR VEHICLE

Filed July 3, 1925

Inventor
John T. Sullivan

By Herbert E. Smith
Attorney

Sept. 7, 1926.
J. T. SULLIVAN
MOTOR VEHICLE
Filed July 3, 1925
1,598,992
3 Sheets-Sheet 3
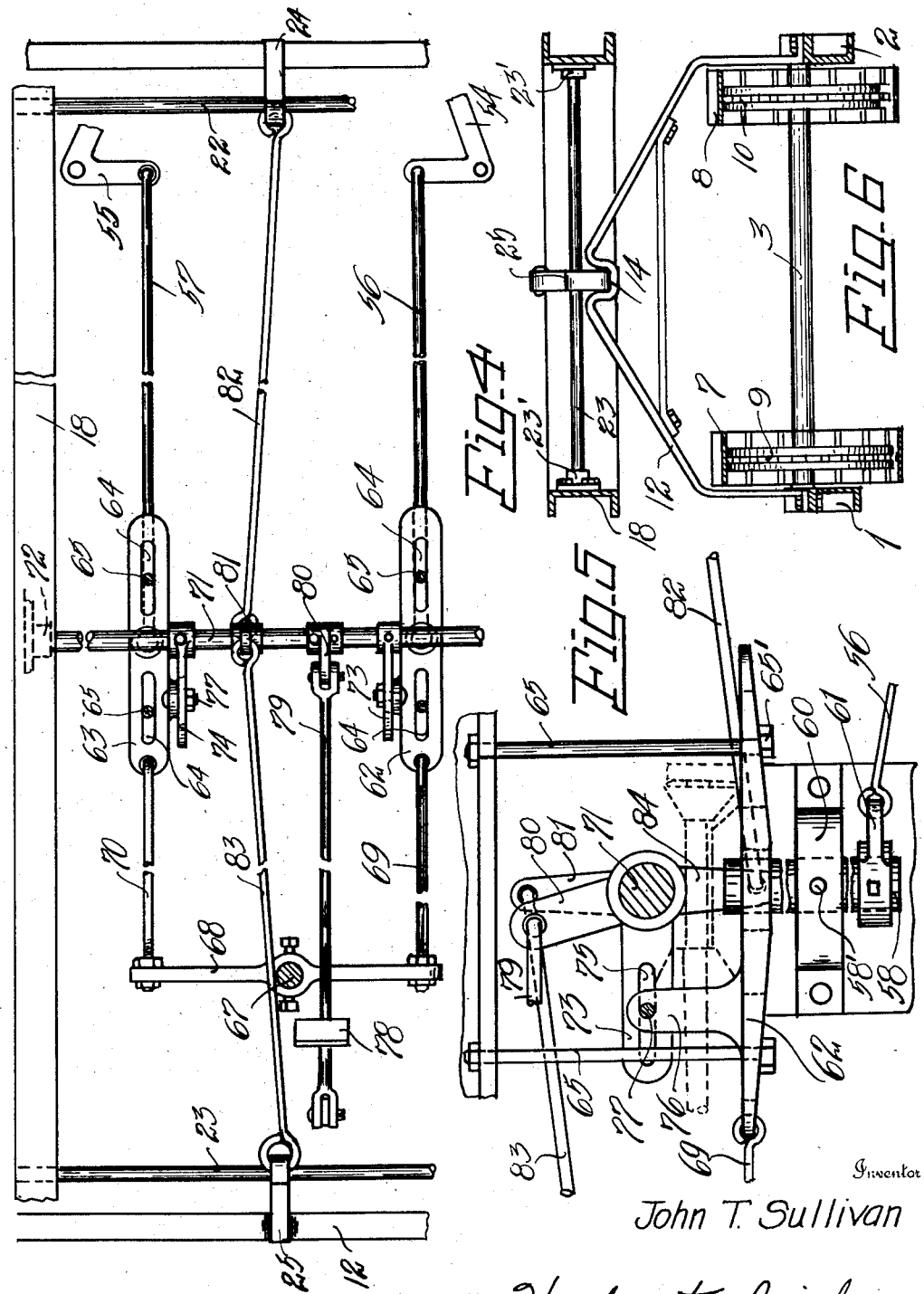
Inventor
John T. Sullivan
By Herbert E. Smith
Attorney Patented Sept. 7, 1926.

1,598,992

UNITED STATES PATENT OFFICE.

JOHN T. SULLIVAN, OF SPOKANE, WASHINGTON.

MOTOR VEHICLE.

Application filed July 3, 1925. Serial No. 41,369.

My present invention relates to improvements in motor vehicles and particularly auto-trucks adapted for heavy duty. The invention involves the use of a dumping body for the truck and means whereby the body may be rotated in a horizontal plane for dumping purposes. Wheel substitutes in the form of portable tracks are preferably employed and means are utilized whereby the truck may be steered or guided by control of these driving devices or portable tracks.

The invention consists in certain novel combinations and arrangements of parts whereby the power may be applied selectively for propulsion of the vehicle or for operating the dumping body and whereby the vehicle may be controlled with facility.

In the accompanying drawings I have illustrated one complete example of the physical embodiment of my invention wherein the parts are combined and arranged in accordance with the best mode I have thus far devised for the practical application of the principles of my invention.

Figure 1 is a view in side elevation of a motor-truck involving the principles of my invention.

Figure 2 is a top plan view of the truck with some parts omitted and some parts in section for convenience of illustration.

Figure 4 is a detail top plan view of the steering control devices and connections for locking and releasing the truck bed or body.

Figure 5 is an enlarged detail view in elevation of one of the duplex control devices.

Figure 6 is a vertical sectional view transversely of the truck.

Figure 3:
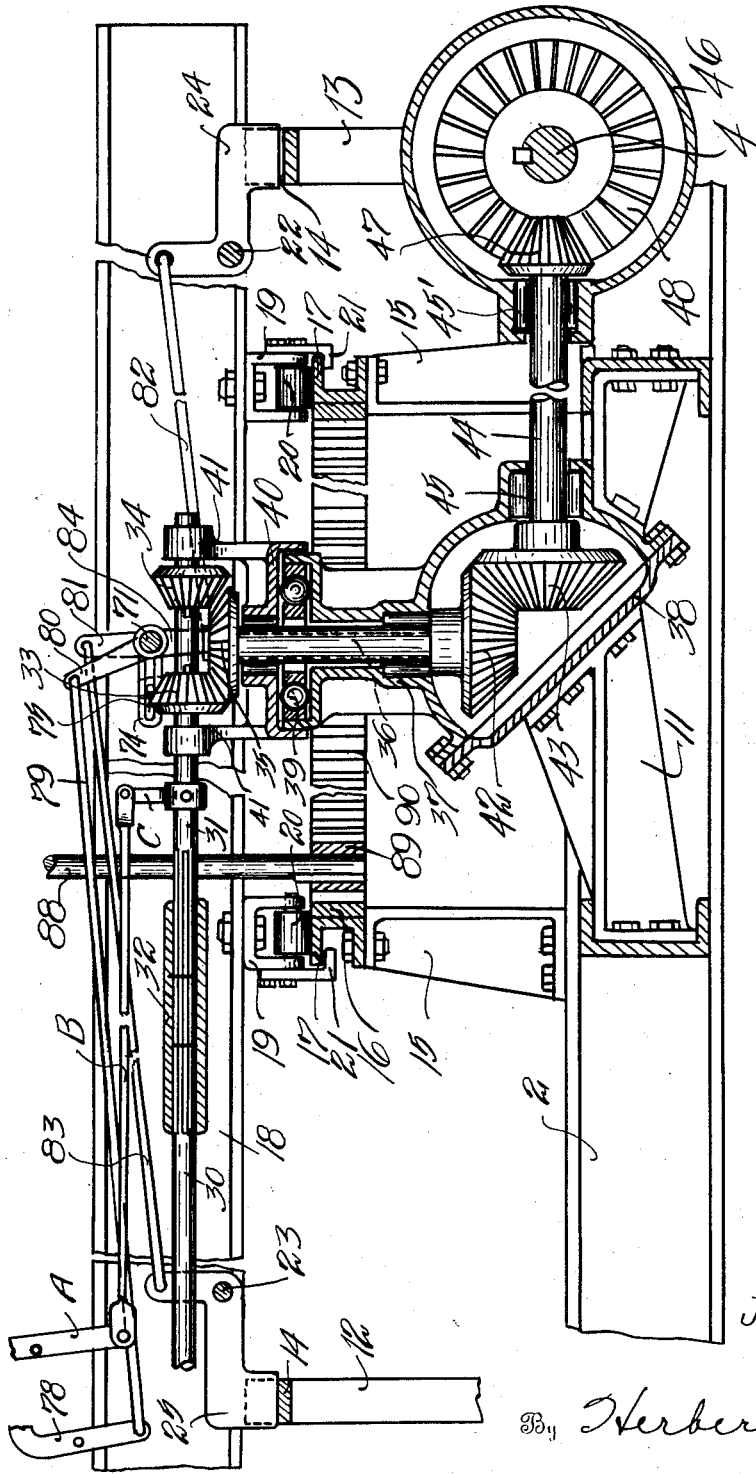
Figure 3 is an enlarged detail vertical longitudinal sectional view at the center portion of the truck showing the transmission mechanism and control connections.

In carrying out my invention I preferably use portable track mechanism at each side of the truck supported in connection with two lower side beams 1 and 2 of channel iron and extending longitudinally of the truck for the support of the front axle 3 and rear or driving axle 4. The driving axle 4 has drive sprockets 5 and 6 rotatable thereon and the portable tracks 7 and 8 pass over these sprockets and complementary sprockets 9 and 10 on the front axle.

At the approximate center of the beams 1 and 2 they are joined by a rigid transverse frame 11 and front and rear arched bars 12 and 13 respectively, which extend transversely of the truck, and provide with the side beams and central frame-portion a rigid lower supporting frame for the truck. The two arched bars 12 and 13 are each provided with a locking notch as 14 alined along the longitudinal axis of the truck for co-action with locking means as will be hereinafter described.

A suitable number of supporting brackets 15 are bolted on top of the lower supporting frame, and a flanged base ring 16 is attached as by bolts to the supporting brackets to rigidly support the ring on the lower frame. The ring is fashioned with an upper exterior annular flange 17 and the main frame of the truck, which is of rectangular shape and made up of channel irons 18, is supported to rotate in a horizontal plane on this base ring. At the underside of the side beams of the main frame 18 are bolted four or more inverted U-shaped hangers as 19 in which antifriction rollers 20 are journaled to ride around on the top of the base ring, and angular retaining lugs 21 are carried by the hangers to extend under the annular flange 17 of the ring to hold the main frame and parts supported thereon in horizontal position.

In connection with the arch bars 12 and 13 of the lower frame means are used for locking the main frame in alined longitudinal position. For this purpose I employ a pair of transversely extending latch bars 22 and 23 supported to rock in brackets or bearings 23' attached at the inner sides of the side beams of the main frame 18 and adjacent to the arch bars 12 and 13, and each latch bar has thereon a latch as 24 and 25 adapted normally to engage in the respective notches 14 of the front and rear arch bars. By this construction, in addition to the central support for the main frame, it is supported as well as locked by co-action of the latches and arch bars at the front and rear of the lower supporting frame.

The body or bed 26 of the truck is of usual or standard shape and is pivoted at 27 at its rear end on brackets 28 bolted to the main frame 18.

The portable tracks are operated to propel the truck and the main frame is rotated in a horizontal plane by connections from a gasoline motor enclosed within the hood 29 and the speed of the truck is controlled by the driver from his seat S by manipulating the lever L of the transmission T, all supported at the front end of the main frame 18.

The propeller shaft and propelling tracks are operated from the engine shaft comprising two alined sections 30 and 31 (Fig. 3) that are coupled to revolve with the sleeve 32 in which the shaft 31 is slidable longitudinally.

The forward and reverse drive of the truck are accomplished through the engine shaft by shifting the section 31 which is provided with a forward drive pinion 33 and a reverse drive pinion 34, both of which are beveled and selectively mesh with the larger drive gear 35 on the vertical stub shaft 36. This stub shaft is disposed centrally of the base ring 17 in a housing 37 which is supported on and above the gear casing 38 rigidly bolted to the center transverse frame 11 of the lower frame. At the upper end of the stub shaft housing a ball bearing 39 is provided, and the cap 40 thereof is provided with bearing brackets 41 for the shaft section 31 to slide in. The shaft 31 is shifted longitudinally of the truck by hand lever A (Fig. 3) which is connected by rod B with the arm C fixed on the shaft-section 31 for controlling the forward or reverse drive of the truck by selective co-action of the pinions 33 and 34 with the gear 35 in usual manner.

At the lower end of the stub shaft 36 is keyed a bevel pinion 42 for co-action with the complementary pinion 43 on the longitudinally disposed propeller shaft 44 which is journaled in bearings 45 of the gear casing 38 and bearings 45′ of the rear axle casing or housing 46. At its rear end the propeller shaft has keyed thereto a bevel pinion 47 for engagement with the complementary driven gear 48 keyed on the rear axle within the housing 46 for transmitting power to the rear or drive axle.

A duplex clutch mechanism is provided for the drive axle both of which are utilized in propelling the truck and a selected one is thrown out of engagement while the other remains in engagement for steering the truck. At the opposite ends of the drive axle and combined with drive sprockets 5 and 6 are provided clutch cones 49 and 50 fixed to and rotatable with the sprockets, and complementary friction clutch cones 51 and 52 are slidable but non-rotatable with reference to the rear axle, springs 53 being provided between the housing and the respective slide cones for normally engaging the respective clutches.

Each clutch device is provided with a yoke as 54 and 55 in the form of pivoted bell crank levers pivoted on a cross brace 55′ on the lower supporting frame, and from these yokes extend a pair of connecting rods 56 and 57 that terminate in line with the transverse axis of the base ring 17 which supports the main frame.

On a line with the transverse axis of the base ring are arranged a pair of spaced, vertically disposed pins 58 and 59, each pivoted as at 58′ in an open bracket 60 bolted to the housing 37 and the two connecting rods 56 and 57 are pivotally connected to arms 61 fixed at the lower ends of these pins and extending toward the rear of the truck.

At the upper ends of the pins are arranged a pair of spaced horizontally disposed longitudinally extending coupling plates 62 and 63 having a loose engagement with their respective pins. As seen in Fig. 4 each plate has a pair of longitudinally extending slots 64 through which are passed four suspending bolts 65 supported from above from the main frame and provided with nuts 65′ on their lower ends to support the plates. The bolts thus form a supporting and guiding frame and suspend the plates so that they may be moved longitudinally of the truck and rock the pins 58 and 59 on their respective pivots 58′ when the clutches are operated.

Both clutches are engaged when the truck is propelled in a straight line, but for steering the truck one of the clutches is thrown out of engagement while the other clutch remains operative, and this steering control of the truck is accomplished from the steering wheel 66 and shaft 67, through means of a transversely disposed steering bar 68 fixed at the lower end of the steering shaft. This steering bar 68 is connected to the coupling plates 62 and 63 by means of rods or links 69 and 70 (Fig. 4) and it will be apparent that as the steering bar 68 is oscillated in a horizontal plane when the wheel shaft 67 is turned, one of the clutches will be released while the other clutch remains closed, and the portable track controlled by the closed or engaged clutch device will drive the truck while the other track remains powerless. When the steering wheel is turned back to original normal position both clutches will be engaged for driving the rear axle.

An operating shaft 71 transversely disposed with relation to the truck and journaled at its ends in bearings 72 (dotted lines Fig. 4) is located above the base ring on a line with its transverse axis.

The operating shaft is provided with a pair of spaced upright crank arms 73 and 74 having slots 75 therein, and these slotted crank arms are connected each to a lug 76 by bolts or pins 77, the lugs being rigid or integral with the coupling plates 62 and 63.

This operating shaft is utilized in releasing the latches 24 and 25 to free the main frame from the lower frame of the truck preparatory to turning the main frame in a horizontal plane. For this purpose a pedal 78 is located at a place for convenient access by the foot of the driver and a crank rod 79 of the pedal is connected to a crank arm 80 of the operating shaft 71. The respective latches 24 and 25 are connected by latch rods 82 and 83 to latch arms 81 and 84 on the shaft 71, and it will be apparent that by depressing the pedal 78, the shaft 71 may be rocked to disengage the latches from the notched arch bars to free the main frame from the lower frame of the truck.

The main frame of the truck and its body or bed 26 may now be revolved with the rollers 20 riding around on the base ring 17 and due to the fact that less power is required to revolve the main frame than is required to drive the portable tracks. Thus the selected drive pinion 33 or 34 in engagement with the now stationary gear 35 causes the main frame to revolve to the desired position.

It will be apparent that with this arrangement of parts the main frame and truck body 26 may be turned on the supporting lower frame through an angle of 180 degrees from the position shown in Figure 1 and then the truck may travel to the right with the driving power applied at the front of what was formerly the rear of the truck. Thus the truck may be run onto the dump with a rear drive, the main frame may be reversed and the load dumped, and then the truck may be driven off the dump without necessity for turning by means of the portable tracks.

The load may thus be dumped at either end of the truck or it may be dumped at either side of the truck by skillful manipulation of an experienced driver.

An electric motor as 86 in Figure 1 may be utilized to supply the power for rotating the body and for returning the body or bed to proper position. The power transmitting devices from the motor as indicated by a gear couple 87, a vertical gear shaft 88 and gear 89 for engagement with teeth 90 on the inner face of the base ring may be utilized as an auxiliary apparatus for turning the main body on its supporting frame.

In Figure 1 a body-hoist device is indicated by the post 91 supported on the main frame, chain 92 and the arm 93 on the body 26 to which the chain is connected, and usual or standard operating and control means are provided for the hoisting mechanism.

Having thus fully described my invention what I claim as new and desire to secure by Letters Patent is—

1. The combination with a supporting frame and its rigid base ring, of a main frame having a roller bearing on said ring, propelling mechanism and driving mechanism co-acting therewith, fixed transversely arranged members on the supporting frame and longitudinally disposed operating means on the main frame for locking the frames while the propelling mechanism is operative, and for permitting rotation of the main frame while the propelling mechanism is inoperative.

2. In a motor vehicle the combination with a supporting frame and propelling mechanism, of a reversible main frame and driving means therefor for co-action with the propelling mechanism, front and rear arch bars on the supporting frame having notches therein, pivoted latches carried by the main frame for co-action with said notches, and means for releasing said latches.

3. In a motor vehicle the combination with a supporting frame having front and rear notched, arch bars transversely thereof and propelling mechanism carried by said frame, of a reversible main frame and an operating shaft supported therein, spaced latch bars in the main frame and latches supported on said bars for co-action with the notched arch bars, crank arms on the operating shaft and connecting rods between said arms and latches.

In testimony whereof I affix my signature.

JOHN T. SULLIVAN.